Figure 1:
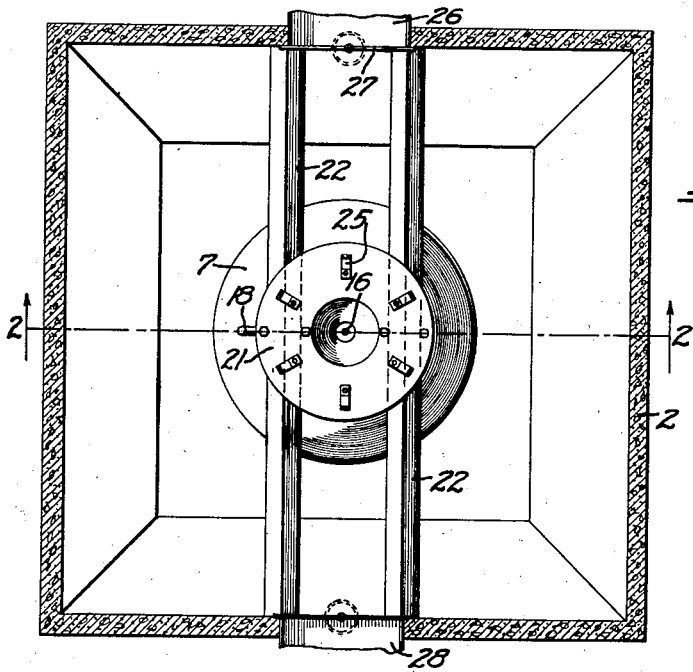

July 19, 1932.　　　F. V. HAMMERLY　　　1,867,824
APPARATUS FOR MIXING FLUIDS
Filed Aug. 18, 1930

INVENTOR.
FRED V. HAMMERLY
BY Charles S. Evans
HIS ATTORNEY

Patented July 19, 1932

1,867,824

UNITED STATES PATENT OFFICE

FRED V. HAMMERLY, OF BERKELEY, CALIFORNIA, ASSIGNOR OF ONE-HALF TO GEORGIA A. HAMMERLY AND ONE-HALF TO CARROLL B. ABBOTT, BOTH OF BERKELEY, CALIFORNIA

APPARATUS FOR MIXING FLUIDS

Application filed August 18, 1930. Serial No. 475,928.

My invention relates to an apparatus for mixing fluids, and particularly to such an apparatus for mixing liquids and gases.

It is among the objects of my invention to provide an apparatus in which controlled amounts of a gas are thoroughly mixed with a liquid.

Other objects of my invention include the provision of an apparatus in which a liquid is repeatedly moved in an agitated stream, into which a gas is injected; thereby maintaining the liquid in a state of complete saturation with the gas at all times.

A further object of my invention is to provide an apparatus which will expedite the biological purification of sewage.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claim.

Figure 2:
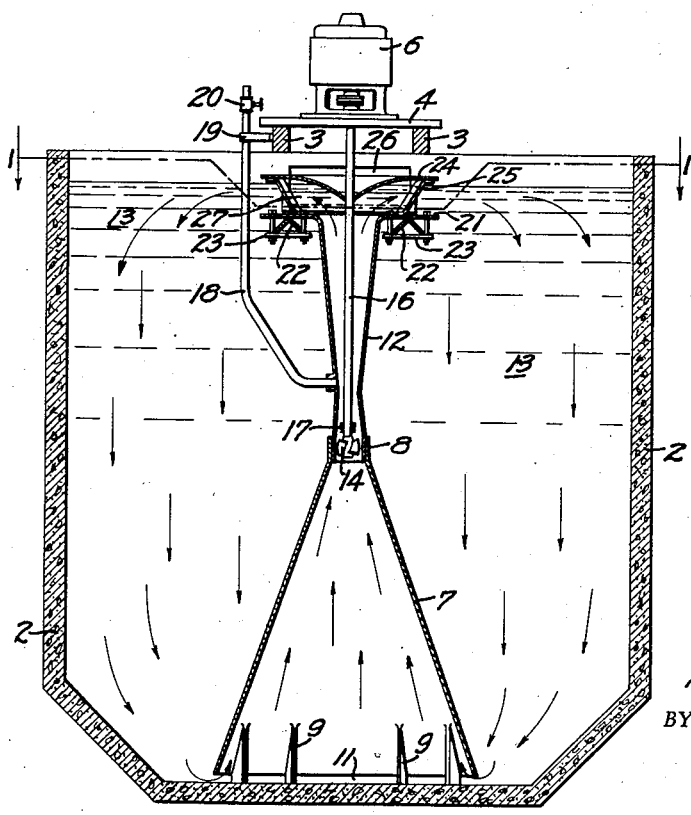

Referring to the drawing:

Figure 1 is a horizontal sectional view of the apparatus embodying my invention, taken in a plane indicated by the line 1—1 of Figure 2; and Figure 2 is a vertical sectional view of the same, taken in a plane indicated by the line 2—2 of Figure 1.

In the following description the apparatus for mixing fluids embodying my invention will be described in connection with the aeration of sewage. It is understood, however, that this particular application of the apparatus is merely taken for the purposes of illustration, and that the apparatus may be used to equal advantage for effecting the mixture of other fluids.

Of all the methods which have been used for the purification of sewage, that of biochemical decomposition or bacterial purification has proved to be most effective. This method is not without its disadvantages, however, due to the slow rate at which the bacteria normally do their work, and the large volumes of raw sewage which have to be treated. When the apparatus for mixing fluids embodying my invention is used in this connection the sewage is maintained in a state of complete saturation with oxygen at all times, and the biological purification is carried on under the most favorable conditions. As a result, large volumes of sewage may be treated in a plant of relatively small size.

In terms of broad inclusion, the apparatus for mixing fluids embodying my invention comprises a tank for receiving a liquid such as sewage. Means are provided for initiating an upwardly moving stream within the tank to circulate and agitate the liquid; and means are provided for introducing a gas, such as air, into the stream. Means are also provided for distributing the mixed fluids on the surface of liquid in the tank; and means are provided for removing a liquid, such as the purified sewage, from the tank.

In greater detail, the apparatus for mixing fluids embodying my invention comprises a tank 2, which may conveniently be made of concrete, having a basin-shaped bottom. Extending across the top of the tank 2 are a pair of girders 3 supporting a platform 4, upon which is mounted a vertical shaft motor 6.

Located centrally of the tank is an inverted funnel 7, preferably arranged so that its neck 8 is positioned adjacent the center of the tank. The funnel is secured to the tank bottom, and is spaced therefrom by a series of legs 9 to provide an opening 11. The throat end of a Venturi tube 12 is connected with the funnel neck 8, and the tube extends upwardly and opens adjacent the top of the tank below the normal level of the tank liquid or sewage sludge 13.

Means are provided for initiating a movement in the sludge, to produce an upwardly moving stream directed thru the funnel 7 and the Venturi tube 12. This is preferably effected by an impeller screw 14 arranged in the neck 8 of the inverted funnel. The impeller is mounted for rotation with the motor 6 by means of an impeller shaft 16 suitably secured to the motor shaft and extending downwardly thru the Venturi tube 12. A support for the lower end of the impeller shaft is provided by a bearing bracket 17 fixed in the throat end of the Venturi tube adjacent the impeller screw 14.

Means are provided for introducing a gas, such as air, into the moving stream of liquid in the tank. A duct 18, held by a girder fixed bracket 19 and extending downwardly into the tank 2, opens into the throat of the Venturi tube 12 adjacently above the impeller 14, and at substantially right angles to the axis of the tube. The duct 18 communicates with a suitable source of the gas to be mixed, and when this gas is air, as in the present instance, the duct may conveniently open in the atmosphere. A valve 20, interposed in the duct 18, is provided for controlling the amount of gas admitted into the throat of the Venturi tube.

In order that the biological processes of sewage purification proceed as rapidly as possible, the bacteria working in the sludge must be supplied with sufficient oxygen. In view of this, it is desirable that the sewage in the tank be supplied with air largely in excess of the quantity normally required for saturation. This condition is quickly attained and continuously maintained by the fluid mixer embodying my invention.

As the sewage sludge 13 is forced up thru the Venturi tube, it is thoroughly broken up into fine particles by the extreme turbulence effected by the action of the high speed impeller. Due to the inherent characteristics of a Venturi tube, the greatest velocity, and consequently the lowest pressure, is found in the throat; as a result, air is drawn down thru the duct 18, and is injected into and entrained by the moving column of liquid with a violent action which causes complete emulsification. The air bubbles are thoroughly mixed with the sludge and are intermingled with the broken sewage particles, so that the bacteria will be adequately supplied with the needed oxygen throughout the sewage mass.

Means are provided whereby the mixed fluids or aerated sewage is distributed over the surface of the liquid in the tank. Arranged below the surface of the fluid 13 in the tank is a circular tube flange 21 surrounding the upper open end of the Venturi tube 12. The flange 21 is supported on a pair of angle bars 22, and is secured by suitable brackets 23.

As the upwardly moving stream of emulsified liquid leaves the discharge end of the Venturi tube 12 it is diverted from its course and directed into a radial movement by a deflecting plate 24 positioned above the Venturi tube and secured to the flange 21 by the spacing arms 25. The deflecting plate 24 surrounds the impeller shaft 16, and is conical in shape with curved sides. The central portions of the plate are below the normal surface of fluid, while the peripheral portions of the plate project slightly above the fluid surface. This arrangement is best shown in Figure 2.

As the upwardly moving stream of aerated sludge breaks into a radial movement adjacent the top of the tank it spreads over the entire surface of the tank sludge. This aerated sludge then slowly circulates downward, meanwhile mixing with the sewage mass in the tank, and is finally drawn into the funnel 7 to again be sent up in an agitated stream for reaeration.

An inlet duct 26, opening into the side of tank 2 and having its discharge end regulated by a slidable gate 27, serves to convey the incoming liquids or raw sewage to the tank; and an outlet duct 28, similar to the inlet duct 26, but arranged on the opposite side of the tank, serves to lead off the treated or purified liquids.

In operation, considering that sewage is being treated, the motor driven impeller 14 forces the sewage, which is admitted from the tank into the inverted funnel 7 through the opening 9, up through the Venturi tube 12 in a moving column or stream. The solid particles of sewage are thoroughly broken up, and the sludge passes through the throat of the Venturi tube in a fast moving and violently agitated state. At this point controlled quantities of air are admitted by the duct 18, and are injected into and entrained by the agitated sludge; the oxygen being dissolved until saturation obtains.

The aerated sludge is then directed to the sides of the tank and distributed on the surface of the tank fluid. After this, the aerated sludge, with its excess quantities of entrained air, disseminates in the tank sewage and causes a thorough distribution of free oxygen throughout the tank. Due to the action of the impeller, the sludge in the tank is continually circulated downward until it is picked up by the funnel and again directed upward and reaerated; this reaerating process being repeated until the sludge has been reduced and the purified liquids are carried off.

The oxygen together with the organic material are the food upon which the bacteria are propagated; their life processes fixing the oxygen to the organics to yield an innocuous product. Owing to the excess quantities of oxygen in the sludge, which gives an abundance of food in a favorable environment, the biological purification is carried on under the most favorable conditions.

I claim:

A sewage purification system comprising a basin-shaped tank for receiving the sewage, an inverted funnel arranged to admit the sewage from the tank, a Venturi tube connected with the neck of the funnel, an impeller positioned in the neck of the funnel for forcing a stream of the sewage thru the funnel and Venturi tube to circulate and agitate the sewage, and an air duct connected with the throat of the Venturi tube for introducing air into the moving stream of sewage.

In testimony whereof, I have hereunto set my hand.

FRED V. HAMMERLY.